Patented Mar. 28, 1944

2,345,406

UNITED STATES PATENT OFFICE 2,345,406

PREPARATION OF CELLULOSE ACETATE PROPIONATES AND CELLULOSE ACETATE BUTYRATES HAVING A HIGH PROPIONYL AND BUTYRYL CONTENT

Carl J. Malm, Rochester, N. Y., assignor to Eastman Kodak Company, Rochester, N. Y., a corporation of New Jersey No Drawing. Application March 17, 1943, Serial No. 479,460

5 Claims. (Cl. 260—225)

This invention relates generally to an improved method of preparing cellulose esters having a high propionyl and butyryl content.

In the making of cellulose esters having a high propionyl and butyryl content, such as cellulose acetate propionates and cellulose acetate butyrates, some break-down of the inherent cellulose viscosity takes place during the esterification process. As this phenomena is ordinarily associated with slow esterification of the cellulose, it appears in the case of high propionyl or high butyryl cellulose esters to be due to the sluggishness of the reaction between the cellulose and the propionic or butyric anhydride employed to esterify the cellulose. Because of this sluggishness acyl groups are not combined with the cellulose as rapidly as occurs in the acetylation process and, therefore, the cellulose, before it is sufficiently protected from degrading action, is lowered to some extent in inherent viscosity. Because of this break-down in the esterification step it has been found advantageous to lower the viscosity of the cellulose as little as possible prior to the esterification, particularly if the obtaining of cellulose esters of medium or high viscosity is desired.

In order to avoid lowering the viscosity of the cellulose in the pretreatment in the making of high propionyl or high butyryl esters, it has been customary to pretreat the cellulose with acetic acid with little or no sulfuric acid, followed by addition of the main part of the sulfuric acid catalyst either with the esterifying anhydride, or after the anhydride has been added to the mass in the esterification step. It has, however, been noticed that the cellulose, during the activation step, becomes packed in certain dead places of the esterification equipment and that the catalyst therefore never reaches this part of the cellulose. Because of the lack of proper treatment of this cellulose which becomes packed or caught in various small indentations in the mixer the resulting cellulose ester contains a considerable amount of unesterified fiber. If more catalyst is added to the pretreatment mixture before the addition of the anhydride, all the cellulose will then contain esterification catalyst and under normal pretreatment conditions the cellulose will break down too much to give a product of good viscosity.

One object of my invention is to provide a method for preparing cellulose esters having a high propionyl or butyryl content in which the cellulose is satisfactorily pretreated, but yet excessive break-down of the inherent viscosity of the cellulose is avoided. Another object of my invention is to provide a method for preparing high propionyl or high butyryl cellulose esters in which a cellulose reaction mass is obtained containing substantially no unesterified fibers therein. Other objects of my invention will appear herein.

I have found that if cellulose is employed having a moisture content of 4–6%, or if cellulose of lower moisture content is employed, sufficient water is added to the pretreatment mixture to bring the water content to 4–6% based upon the weight of cellulose, the pretreatment is carried out below 90° F. with a certain amount of catalyst, as will be pointed out herein and the water in the cellulose is then destroyed by means of anhydride without promoting the esterification of the cellulose at that time, as will be more fully described herein, that cellulose esters are obtained in which the viscosity is not lowered to an unsatisfactory degree or, in other words, the manufacture of medium and high viscosity cellulose esters having a high propionyl or high butyryl content is made possible. I have found that the reaction between the cellulose and the propionic or butyric anhydride can be controlled by temporarily stopping the mixing of the esterification mass while at the same time running warm water through the water jacket of the esterification vessel, and after the water has been destroyed the mixing action may then be started accompanied by the circulation of cold water through the jacket of the mixer.

Ordinarily the cellulose which is employed for preparing cellulose esters has a reduced moisture content such as down to 2% or less so as to avoid excessive generation of heat when this water content combines with the anhydride at the start of the esterification stage. Many of the esterification methods described in the prior art contain suggestions as to removing the water from the cellulose before the actual esterification reaction is begun. In my invention, however, I employ a cellulose to which has been imparted a moisture content of 4–6% and preferably between 5 and 6%, and only sufficient catalyst in the pretreatment to promote the activation of the cellulose and to cause a subsequent reaction between water and anhydride without allowing the reaction between the cellulose and anhydride to proceed to a point where it cannot be controlled. The pretreatment is carried out at a temperature below 90° F. such as between 60 and 85° F.

The amount of sulfuric acid which is incorporated in the pretreatment mixture should be between .2 and 2% based on the weight of the cellulose. After the pretreatment mixture of acetic acid and the very small amount of sulfuric acid is prepared, the cellulose containing the moisture content specified in accordance with my invention may then be added thereto and the mass is allowed to mix at between 60° and 85° C., whereby good activation is obtained.

After the pretreatment has occurred, for instance, by mixing the cellulose pulp with acetic acid and a small proportion of sulfuric acid and at the temperature specified for a limited period of time, propionic or butyric anhydride is added to the mass which involves at first only the reaction between the water present and the anhydride without allowing the cellulose to be reacted upon to any appreciable extent. If this anhydride were added to the cellulose mass in refrigerated condition, such as having a temperature of 10° F., the temperature of the mixer would be so low that it would be either necessary to mix in more catalyst to start the reaction or raise the temperature. A further addition of catalyst would make it impossible to control the cellulose reaction after the completion of the reaction between the water and anhydride. If, instead of adding an increased amount of catalyst, the temperature of the mass is increased to a point where the reaction of the water and anhydride starts with the catalyst present, the temperature would be so increased that by the end of the reaction with the water a point would be reached where the cellulose reaction goes out of control in the ordinary method of preparing cellulose esters.

I have found a procedure whereby the increased amount of catalyst is unnecessary, yet control of the esterification of the cellulose is not lost and the viscosity of the cellulose is not seriously reduced. In accordance with my process, after the pretreatment the temperature of the mass is reduced to a sufficiently low point to make it possible to control the reaction, such as by adding the propionic or butyric anhydride in cooled condition, for instance, having a temperature of 10–20° F. as well as running cold water (such as 20–40° F.) through the water jacket of the esterification vessel. Upon this addition the temperature of the mass is cooled down to below approximately 50° F., whereupon the mixing of the mass is stopped. The temperature of the water jacket of the mixer is then brought up to a temperature which will cause the water reaction to take place, such as a temperature of 100–110° F. The reaction of the water and anhydride thus starts in the mass next to the water jacket and, due to the lack of motion of the mass, slowly proceeds towards the center of the vessel. Because of the heat insulating properties of the reaction mass the heat of the jacket adds very little heat to the mass. After a sufficient time to permit the reaction between the water present in the mass and the anhydride to get well started, which is ordinarily approximately 15 minutes, cold water is led into the water jacket surrounding the esterification vessel or mixer and mixing of the mass is started. The portion of the mass in contact with the outside walls has a higher temperature which "seeds" the water reaction throughout the mass upon starting and mixing. However, the reaction mass, being cold and the water jacket containing cold water, substantially no esterification reaction takes place.

In its broader aspects my invention comprises the making of high propionyl or high butyryl cellulose esters in which a cellulose starting material having a moisture content of 4–6% is pretreated with a pretreating liquid of saturated fatty acid of 2–4 carbon atoms, the major portion of which is acetic acid, but containing .2–2% of sulfuric acid based on the weight of the cellulose, then mixing the esterifying anhydride into the mass while in cooled condition, stopping the mixing of the mass and warming the walls of the esterification vessel until the reaction between the moisture present and the anhydride contained in the mass is well under way. This is then followed by the esterification reaction in which reaction the temperature is kept under control, which is facilitated by my invention, thus preventing break-down of the inherent viscosity of the cellulose whereby high propionyl or high butyryl esters having a good viscosity are obtained.

My invention relates to the preparing of cellulose esters having a content of saturated fatty acid groups of 3–4 carbon atoms of at least 25%, or in other words, cellulose esters in which propionic and/or butyric anhydride is used to a large extent as the esterifying anhydride in their esterification. My invention contemplates not only the making of cellulose acetate butyrates and cellulose acetate propionates, but also of cellulose acetate propionate butyrates in which a high combined propionyl and butyryl content is present. The following example illustrates my invention:

480 pounds of acetic acid and 8 pounds of sulfuric acid were placed in a mixer and 600 pounds of refined wood pulp, having a high alpha content and a moisture content of 5.5%, was added thereto. The mass was mixed together and cooled for one hour from 80° to 60° F. 2400 pounds of butyric anhydride, cooled to 20° F., was then thoroughly mixed in the mass. When the anhydride was well distributed the temperature of the reaction mixture was 35° F. The mixer action was stopped and water at a temperature of 110° F. was passed through the water jacket of the vessel. 15 minutes later, water having a temperature of 30° F. was passed through the jacket of the mixer and the mixing was again started. The temperature of the reaction mixture rose rapidly to a peak temperature of 85° F., but within 1½ hours had been reduced to below 60° F. At this point a mixture of 8 pounds of sulfuric acid and 8 pounds of acetic acid was added and the esterification was allowed to proceed to a maximum temperature of 80° F. After 7 hours a very viscous, clear solution of cellulose acetate butyrate was obtained. The cellulose ester was separated from the reaction mixture by the method described and claimed in Fletcher and Crane, Patent No. 2,339,631, dated January 18, 1944. The resulting ester was of good viscosity and well suited for the making of sheeting such as by coating out from a volatile solvent or for any other purpose for which a high viscosity, high butyryl cellulose acetate butyrate is desired.

The procedure which I have outlined may be adapted to any of the commonly known commercial methods of preparing cellulose acetate propionates or cellulose acetate butyrates, such as by esterifying cellulose with a reaction mixture of 4 parts of propionic or butyric anhydride and 3–5% of sulfuric acid based on the weight of the cellulose, with the esterification temperature being allowed to rise to not more than 90° F. Processes to which my invention is especially adaptable are those which are in accordance with Blanchard Patent No. 2,304,792, granted December 15, 1942. It is to be understood, however, that although my invention is of particular value with processes of that kind, it is also valuable in any process of preparing cellulose esters having a high propionyl or butyryl content as an aid in preventing excessive lowering of the inherent viscosity of the cellulose, which lowering results in reduced viscosities in the cellulose esters obtained. My invention is adapted to processes of esterifying cellulose esters both for the manufacture of fully esterified cellulose esters as well as where a hydrolyzed product is desired.

I claim:

1. A method of preparing cellulose esters, having a content of saturated fatty acid groups of 3–4 carbon atoms of at least 25% which comprises pretreating cellulose having a moisture content of 4–6% with a bath essentially consisting of saturated fatty acid of 2–4 carbon atoms, a major portion of the fatty acid being acetic, and .2–2% (based on the weight of the cellulose) of sulfuric acid at a temperature of 60–85° F., thoroughly mixing cold anhydride of a fatty acid of 3–4 carbon atoms therewith and cooling the mass to a temperature of less than 50° F., stopping the mixing and warming the walls of the containing vessel to a temperature of 100–110° F. only for a time sufficient to start a reaction between the anhydride and the water contained therein, again cooling the mass and resuming the mixing, and after the water has been destroyed adding additional sulfuric acid and esterifying the cellulose at a temperature not to exceed 90° F.

2. A method of preparing cellulose esters having a content of saturated fatty acid groups of 3–4 carbon atoms of at least 25%, which comprises the following steps: (1) pretreating cellulose having a moisture content of 4–6% with a bath essentially consisting of acetic acid and .2 to 2% (based on the weight of the cellulose) of sulfuric acid at a temperature of 60–85° F., (2) mixing cold anhydride into the mass and cooling to a temperature between 20° F. and 50° F., (3) stopping the mixing and warming the walls of the containing vessel to 100–110° F. until a reaction is started between the water and anhydride present in the mass, (4) cooling the walls of the containing vessel, resuming the mixing and adding further sulfuric acid to the mass, thus initiating the esterification of the cellulose which is controlled so that a temperature of 90° F. is not exceeded.

3. A process for preparing a cellulose ester having a butyryl content of at least 25% from cellulose having a moisture content of 4 to 6%, comprising the following steps: (1) pretreating the cellulose with a bath essentially consisting of saturated fatty acids of 2 and 4 carbon atoms, the major portion of the bath being acetic acid, and .2 to 2% (based on the weight of the cellulose) of sulfuric acid at 60–85° F., (2) cooling the mass, mixing cold butyric anhydride therewith and imparting a temperature of 20 to 50° F. thereto, (3) stopping the mixing and warming the walls of the vessel containing the mass, to 100–110° F. to start a reaction between the anhydride and water present, (4) resuming the mixing and introducing sulfuric acid so as to initiate esterification of the cellulose which is controlled so that a temperature of 90° F. is not exceeded.

4. A process for preparing a cellulose ester having a propionyl content of at least 25% from cellulose having a moisture content of 4 to 6%, comprising the following steps: (1) pretreating the cellulose with a bath essentially consisting of saturated fatty acids of 2–3 carbon atoms, the major portion of the bath being acetic acid, and .2 to 2% (based on the weight of the cellulose) of sulfuric acid at 60–85° F., (2) cooling the mass, mixing cold propionic anhydride therewith and imparting a temperature of 20 to 50° F. thereto, (3) stopping the mixing and warming the walls of the vessel containing the mass to 100–110° F. to start a reaction between the anhydride and water present, (4) resuming the mixing and introducing sulfuric acid so as to initiate esterification of the cellulose which is controlled so that a temperature of 90° F. is not exceeded.

5. A method of preparing cellulose acetate butyrate which comprises the following steps: (1) pretreating refined cellulose having a moisture content of 5–6% with a bath essentially consisting of acetic acid and .2–2% (based on the weight of the cellulose) of sulfuric acid at a temperature of 60–85° F., thoroughly mixing cold butyric anhydride therewith, stopping the mixing and warming the walls of the containing vessel to 100–110° F., after a short time cooling the walls of the containing vessel and resuming the mixing until the temperature of the mass reaches 60° F., thereupon adding sulfuric acid to initiate the esterification, and controlling that reaction so that the temperature does not exceed 90° F.

CARL J. MALM.